United States Patent
Umizaki et al.

(10) Patent No.: US 8,413,676 B2
(45) Date of Patent: Apr. 9, 2013

(54) CONSTRUCTION MACHINE

(75) Inventors: Yuuki Umizaki, Koka (JP); Yasutaka Tsuruga, Moriyama (JP); Teruo Irino, Konan (JP); Makoto Motozu, Ritto (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 12/596,900

(22) PCT Filed: Jul. 22, 2008

(86) PCT No.: PCT/JP2008/063482
§ 371 (c)(1),
(2), (4) Date: Oct. 21, 2009

(87) PCT Pub. No.: WO2009/017076
PCT Pub. Date: Feb. 5, 2009

(65) Prior Publication Data
US 2010/0236642 A1   Sep. 23, 2010

(30) Foreign Application Priority Data
Aug. 2, 2007   (JP) .................................. 2007-201913

(51) Int. Cl.
*B60R 16/08*   (2006.01)
*E02F 9/00*   (2006.01)
(52) U.S. Cl. ................ 137/355.12; 137/354; 137/355.16
(58) Field of Classification Search .................. 137/351, 137/354, 899, 355.12, 355.26, 355.27, 355.28, 137/565.11, 565.16, 565.17, 571, 376, 355.16
See application file for complete search history.

(56) References Cited

U.S. PATENT DOCUMENTS

| | | | | |
|---|---|---|---|---|
| 2,418,808 A | * | 4/1947 | Benson | 137/355.16 |
| 4,064,901 A | * | 12/1977 | Bailey | 137/351 |
| 5,082,217 A | * | 1/1992 | Parker et al. | 248/75 |
| 5,349,980 A | * | 9/1994 | Spiegel | 137/1 |
| 5,577,772 A | * | 11/1996 | Kaiser | 280/838 |
| 5,732,733 A | * | 3/1998 | Negus et al. | 137/355.27 |
| 6,056,168 A | * | 5/2000 | Owen, Jr. | 222/608 |
| 6,568,746 B2 | * | 5/2003 | Sakyo et al. | 296/190.08 |
| 6,688,328 B2 | * | 2/2004 | Van Wie | 137/376 |
| 6,957,668 B1 | * | 10/2005 | Highsmith | 137/899 |
| 7,025,082 B1 | * | 4/2006 | Wood | 137/351 |

* cited by examiner

FOREIGN PATENT DOCUMENTS

| | | | |
|---|---|---|---|
| JP | 2002-89391 A | | 3/2002 |
| JP | 2002-266377 A | | 9/2002 |
| JP | 2006328883 A | * | 12/2006 |

OTHER PUBLICATIONS

Machine translation of JP 2006328883.*
Machine translation of JP 2002089391.*

*Primary Examiner* — John Fox
*Assistant Examiner* — Kevin Murphy
(74) *Attorney, Agent, or Firm* — Mattingly & Malur, PC

(57) ABSTRACT

A hose looping supporter (21) is provided on an upper surface (13A) of a lid (13) of a tank body (12) constituting an operating oil tank (11). This hose looping supporter (21) is constituted by a mounting member (22) mounted on the lid (13) and four retaining arms (23) each bent in a substantially J-shape. A suction hose (19) has its midway portion adapted to be looped annularly, and this looped hose portion (19B) is mounted by being held looped by each revolving frame (23). Meanwhile, in the case of replenishing a fuel tank (15) with fuel, the suction hose (19) can be easily removed from each retaining arm (23) of the hose looping supporter (21) by reducing the diameter of the looped hose portion (19B) of the suction hose (19).

7 Claims, 13 Drawing Sheets

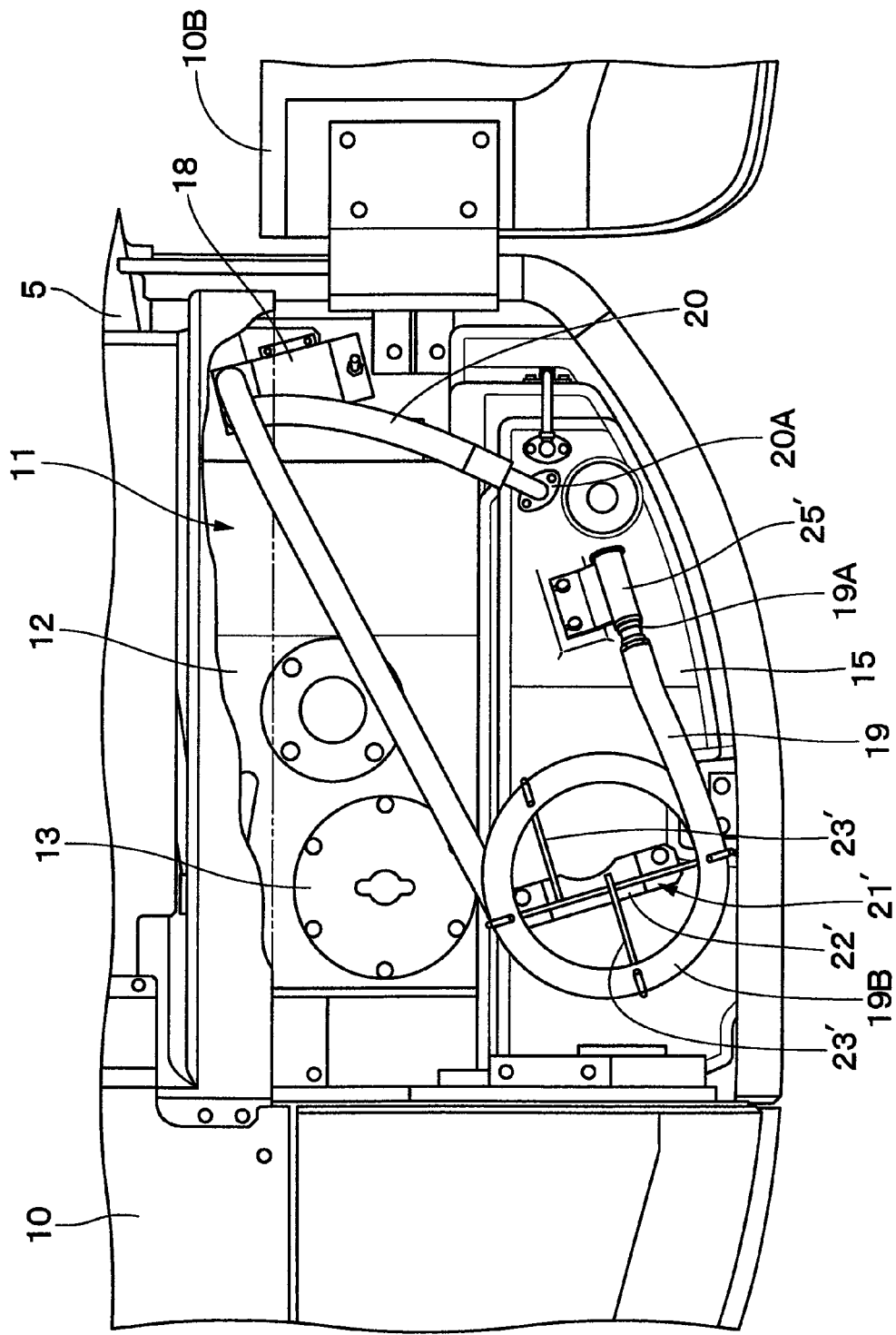

CONSTRUCTION MACHINE

TECHNICAL FIELD

The present invention relates to a construction machine such as a hydraulic excavator or the like, and more particularly to a construction machine having a fuel pump and a suction hose for replenishing a fuel tank with fuel.

BACKGROUND ART

Generally, a hydraulic excavator, which is a typical example of construction machines, is comprised of a lower traveling structure, an upper revolving structure mounted swingably on the lower traveling structure, and a working mechanism liftably provided on a front side of the upper revolving structure. Further, the lower traveling structure and the upper revolving structure form a vehicle body of the hydraulic excavator. Furthermore, the upper revolving structure is largely constituted by a revolving frame forming a supporting structural body; a cab which is provided on a left front side of the revolving frame and where an operator gets on board; an engine and a hydraulic pump mounted on a rear side of the revolving frame; and an operating oil tank and a fuel tank mounted on a right side of the revolving frame.

Here, in the case of replenishing the hydraulic excavator, a fuel supply truck (fuel tank truck) is used, and its fuel supply hose is connected to the fuel tank to replenish. However, in a work site where the hydraulic excavator is used, roads where the fuel supply truck can travel are not numerous. Accordingly, in many cases, an oil storage container such as a drum can in which fuel is stored, a portable fuel pump, and a fuel supply hose are transported in advance to the work site. Then, at the time of replenishing, the fuel pump is set to the oil storage container, and the oil supply hose is set to the fuel tank of the hydraulic excavator, so as to perform replenishing. Accordingly, with such a prior art, the fuel pump and the oil supply hose, together with the oil storage container such as a drum can, must be transported to the work site, which is troublesome.

Accordingly, among the hydraulic excavators, there is a type which is equipped in advance with a fuel pump for injecting fuel into the fuel tank from the oil storage container and an elongated suction hose provided by being connected to a suction port of the fuel pump and adapted to suck the fuel in the container toward the fuel pump (see, for example, Patent Literature 1: Japanese Patent Laid-Open No. 2002-266377 A).

With this hydraulic excavator, as the suction hose is extended and a suction port at its distal end is inserted into the oil storage container, and the fuel pump is driven in this state, the fuel in the oil storage container can be supplied into the fuel tank. In addition, the arrangement provided is such that, at normal times when replenishing is not carried out, the suction hose is coiled up into a compact form and is accommodated in a case provided on top of the revolving frame.

In this case, in the hydraulic excavator according to the aforementioned Patent Literature 1, each time a replenishing operation is carried out, it is necessary to extend the suction hose coiled up over its entire length and coil it up again into a compact form so as to be stored in the case. Hence, there is a problem in that labor and time are unfavorably required for the replenishing operation. Moreover, in order to keep the suction hose in the state of being coiled up in a compact form, the suction hose must be bound by using a binding band or the like. Since the suction hose in its entirety is coiled up in the compact form when it is stored, there is a problem in that a loop kink is unfavorably formed in the suction hose during the storage, making it difficult to extend the suction hose during the replenishing operation.

DISCLOSURE OF THE INVENTION

In view of the above-discussed problems with the prior art, it is an object of the present invention to provide a construction machine which facilitates the operation of removing and storing the suction hose and allows the suction hose to be easily connected to a replenishing container, thereby making it possible to improve workability during the replenishing operation.

(1) A construction machine according to the present invention comprises: an automotive vehicle body with an engine mounted thereon for driving a hydraulic pump; an operating oil tank provided on the vehicle body to store operating oil to be supplied to the hydraulic pump; a fuel tank provided on the vehicle body adjacently to the operating oil tank to store fuel to be supplied to the engine; a fuel pump provided in a vicinity of the operating oil tank and/or the fuel tank to inject the fuel into the fuel tank from a container with the fuel for replenishment stored therein; and an elongated suction hose provided by being connected to a suction port of the fuel pump and adapted to suck the fuel in the container toward the fuel pump.

Moreover, to overcome the above-described problems, the construction machine according to the present invention is characterized in that a hose looping supporter for supporting a looped hose portion formed by annularly looping a lengthwise midway portion of the suction hose is provided on a top surface side of one tank of the operating oil tank and the fuel tank.

By adopting the above-described construction, in the case of performing the replenishing operation, the looped hose portion is removed from the hose looping supporter, and the looped hose portion is extended by pulling the suction hose. Then, a distal end of the suction hose is inserted into an oil storage container such as a drum can be disposed in the environment of the construction machine. As the fuel pump is driven in this state, the fuel in the container can be sucked by the suction hose and can be injected into the fuel tank. Meanwhile, after completion of the replenishing, the distal end of the suction hose is pulled out from the oil storage container, and a midway portion of that suction hose is looped annularly and is disposed on the hose looping supporter on top of the tank. In consequence, the suction hose can be stored between the fuel tank and the top surface side of the tank in such a manner as to be lined along the tank.

Then, when the looped hose portion of the suction hose is disposed on the hose looping supporter, the suction hose tends to return to its straight form and tends to spread radially outward. However, the hose looping supporter is able to press from the outer peripheral side the looped hose portion tending to spread, and is able to fix the looped hose portion in a predetermined position by stably supporting it.

As a result, the hose looping supporter is able to fix the looped hose portion of the suction hose without separately using a binding band or the like, so that operations of mounting and dismounting the suction hose with respect to the hose looping supporter can be performed easily, thereby improving workability. Since the midway portion of the suction hose is looped and is mounted to the hose looping supporter, the looped hose portion can be formed by merely winding the hose. Furthermore, since the hose looping supporter is provided on the top surface side of the operating oil tank or the fuel tank, there are few objects that lie in the way in the surroundings during the operation, and the suction hose can be handled in a wide space. Workability can be improved in this respect as well.

(2) In this case, according to the present invention, the hose looping supporter has a plurality of retaining arms for retaining the looped hose portion of the suction hose at intervals so that the suction hose does not spread.

By virtue of this construction, the plurality of retaining arms are able to stably support the hose looping supporter so that the suction hose does not spread, so that it is possible to improve the handling efficiency, reliability, and the like.

(3) According to the present invention, the hose looping supporter is constituted by a mounting member formed of a plate-like body and mounted on a top surface of the tank and a plurality of retaining arms each formed by bending a bar-like body substantially into a J-shape and secured to the mounting member at intervals so as to extend upward.

By virtue of this construction, the retaining arms each bent in a substantially J-shape are able to retain the looped hose portion by making use of the force with which the looped hose portion tends to extend straightly. Accordingly, the retaining arms of the hose looping supporter are able to stably support the looped hose portion even in cases where vibrations have occurred during traveling or operation.

(4) According to the present invention, a suction port holding member for holding a suction port of a distal end portion of the suction hose is provided on the tank.

In consequence, the suction port holding member is able to fix the distal end portion of the suction hose so that the distal end portion of the suction hose will not run wild during traveling or operation. Moreover, the suction port holding member is able to prevent residual fuel leaking out slightly from inside the suction hose from scattering to the surroundings, thereby making it possible to keep the surroundings of the tank clean.

(5) According to the present invention, the tank is constituted by an upright body-shaped tank body having at least a top surface and by a lid provided detachably on a top surface side of the tank body, and the hose looping supporter is mounted on the lid.

In consequence, the hose looping supporter can be mounted on the tank by making use of the lid of the tank. Furthermore, the hose looping supporter can also be mounted or dismounted together with the lid.

(6) According to the present invention, the hose looping supporter supports the looped hose portion of the suction hose at a position spaced apart by a certain dimension upwardly from a top surface of the tank.

In consequence, when the hose looping supporter supports the looped hose portion of the suction hose, the looped hose portion can be supported at the position spaced apart upwardly from the top surface of the tank. In consequence, it is possible to prevent such as the contact and interference between the suction hose and the tank, making it possible to prolong the service life of the suction hose. Since a working space can be formed between the tank, on the one hand, and the hose looping supporter and the suction hose, on the other hand, it is possible to perform the maintenance work and the like with the hose looping supporter mounted as it is.

(7) According to the present invention, the vehicle body is constituted by an automotive lower traveling structure and an upper revolving structure mounted swingably on the lower traveling structure, wherein the operating oil tank and the fuel tank are disposed by being juxtaposed in a widthwise direction of the vehicle body such that the operating oil tank is located on a side of a revolving center of the upper revolving structure, and the hose looping supporter is provided on the top surface side of the operating oil tank, the fuel pump is provided on a front side of the operating oil tank, a delivery side thereof being connected to the fuel tank, and the suction hose has a base end portion thereof connected to the fuel pump and the midway portion thereof adapted to be held looped by the hose looping supporter on top of the operating oil tank.

In consequence, the fuel pump can be provided on the front side of the operating oil tank. Moreover, the top surface side of the operating oil tank can be effectively utilized as a place of installation of the hose looping supporter and a place of disposition of the looped hose portion. Additionally, other equipment such as a battery can be disposed on the top surface side of the fuel tank.

BRIEF DESCRIPTION OF THE DRAWINGS

In the accompanying drawings:

FIG. 13 is an enlarged plan view of essential portions of a second modification of the present invention, taken from a similar position to that of FIG. 3.

DESCRIPTION OF REFERENCE NUMERALS

Figure 1:
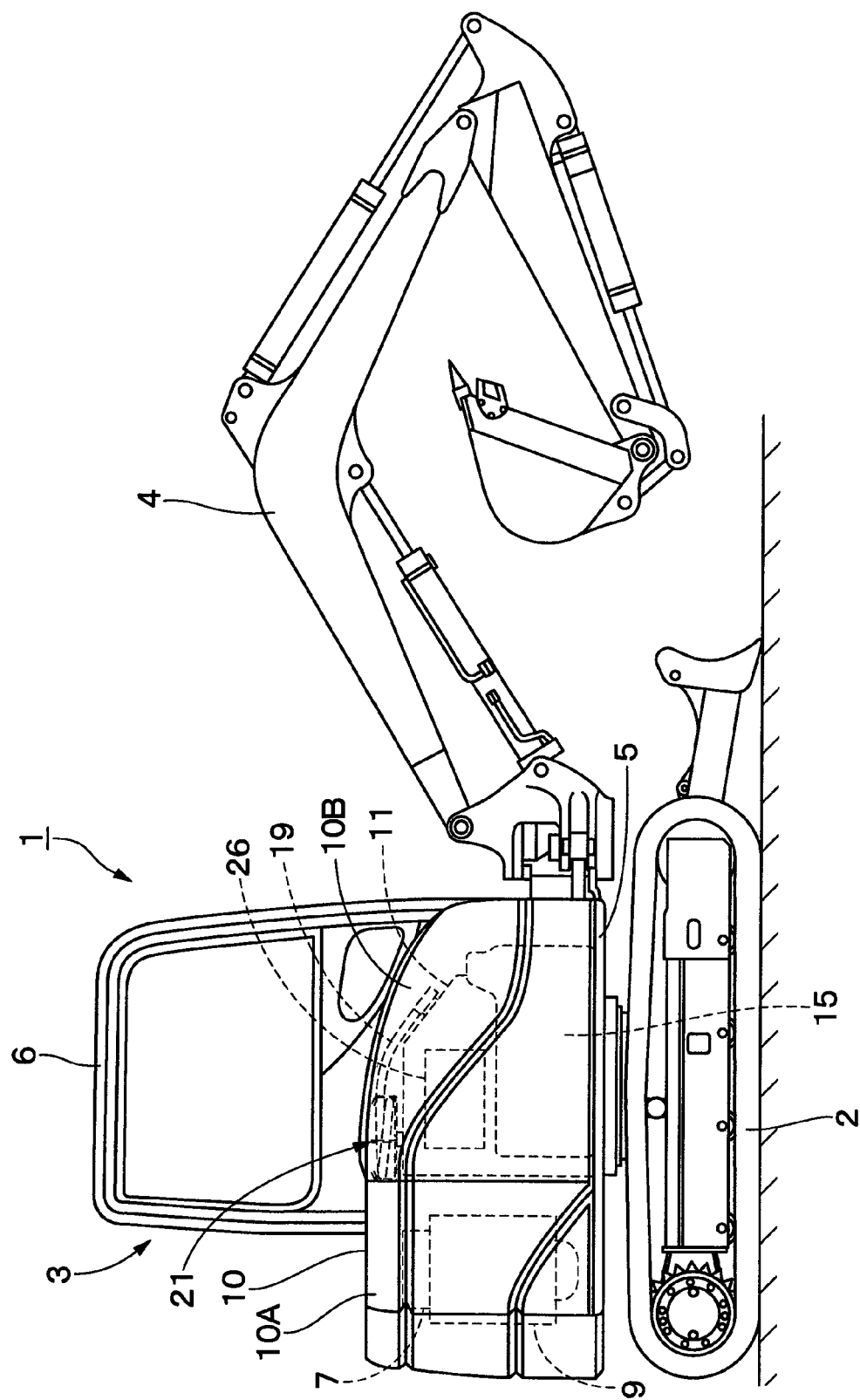
FIG. 1 is a front view illustrating a hydraulic excavator in accordance with an embodiment of the invention.

1: Hydraulic excavator (construction machine)
2: Lower traveling structure (vehicle body)
3: Upper revolving structure (vehicle body)
5: Revolving frame 6: Cab
7: Engine
8: Hydraulic pump
10: Exterior housing cover
11: Operating oil tank
12: Tank body
13: Lid
14: Bolt
15, 41: Fuel tank
18: Fuel pump
19: Suction hose
19A: Suction port
19B: Looped hose portion
20: Delivery hose
21, 31, 21': Hose looping supporter
22, 32, 22': Mounting member
23, 33, 23': Retaining arm
24: Protection cap
25, 25': Suction port holding member
27: Oil storage container
H, H1, H2: Height dimension

BEST MODE FOR CARRYING OUT THE INVENTION

Referring to FIGS. 1 to 11, a detailed description will be given hereafter by citing a hydraulic excavator as a typical example of construction machines in accordance with an embodiment of the present invention.

In FIG. 1, indicated at 1 is a hydraulic excavator as a construction machine. This hydraulic excavator 1 is largely constituted by an automotive crawler-type lower traveling structure 2, an upper revolving structure 3 mounted swingably on top of the lower traveling structure 2, and a working mechanism 4 mounted elevatably on the front side of the upper revolving structure 3 to perform such as the operation of excavating earth and sand. Here, a vehicle body in accordance with the present invention is constituted by the lower traveling structure 2 and the upper revolving structure 3 mentioned above.

Figure 2:
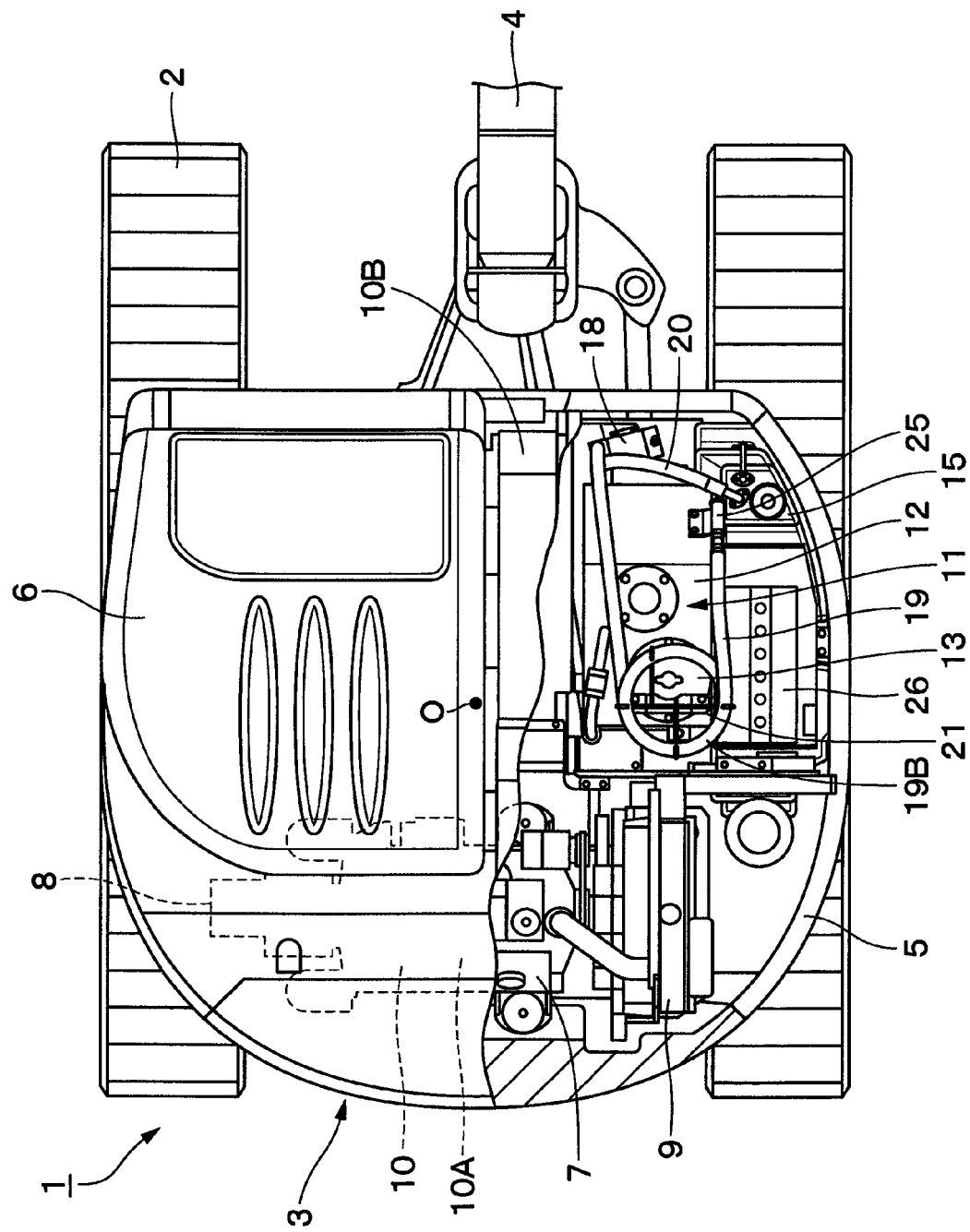
FIG. 2 is a plan view illustrating the hydraulic excavator in enlarged form in a state in which a working mechanism and a part of an exterior housing cover are cut away.

In this case, the upper revolving structure 3 mounted swingably on top of the lower traveling structure 2 is formed in a substantially circular shape as viewed from the upper side, as shown in FIG. 2, so that the upper revolving structure 3 will not collide against a surrounding obstacle when it undergoes a revolving operation. The upper revolving structure 3 is largely constituted by a revolving frame 5 constituting a supporting structural body and having the working mechanism 4 mounted on its front part; a cab 6 which is provided on the left front side of the revolving frame 5 and where an operator gets on board; an engine 7 mounted on the rear side of the revolving frame 5 in a transversely mounted state; a hydraulic pump 8 mounted on the left side of the engine 7; a heat exchanger 9 such as a radiator and an oil cooler provided on the right side of the engine 7; an operating oil tank 11, a fuel tank 15, a fuel pump 18, and a suction hose 19 which will be described hereinafter and are provided on top of the revolving frame 5 by being located on the right side of the cab 6; and an exterior housing cover 10 provided over the revolving frame 5 so as to cover these equipments.

Figure 3:
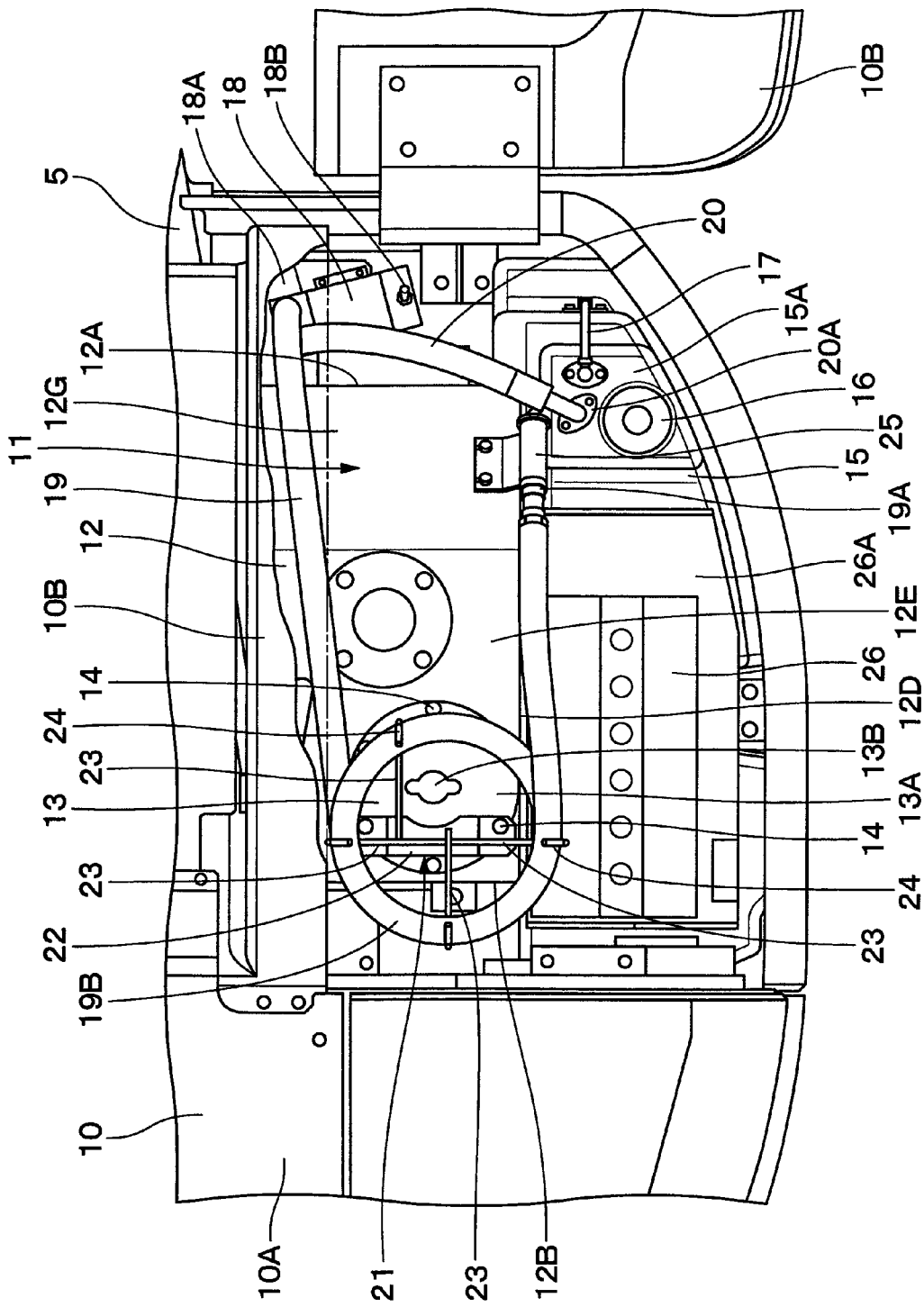
FIG. 3 is an enlarged plan view of essential portions illustrating a right-side portion of an upper revolving structure with a tank cover open.
Figure 4:
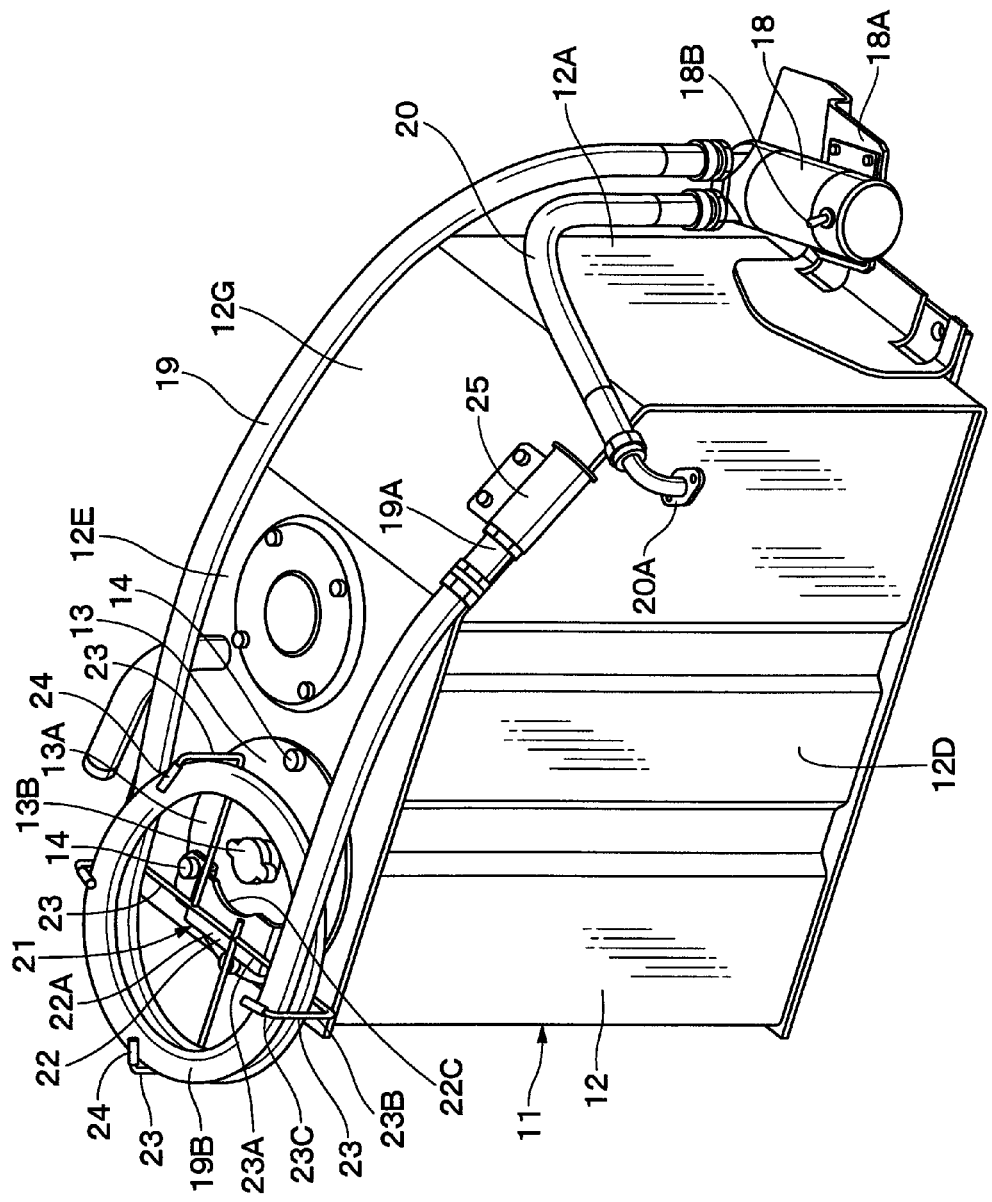
FIG. 4 is an external perspective view illustrating an operating oil tank, a fuel tank, a suction hose, a hose looping supporter, a suction port holding member, and the like in enlarged form.
Figure 5:
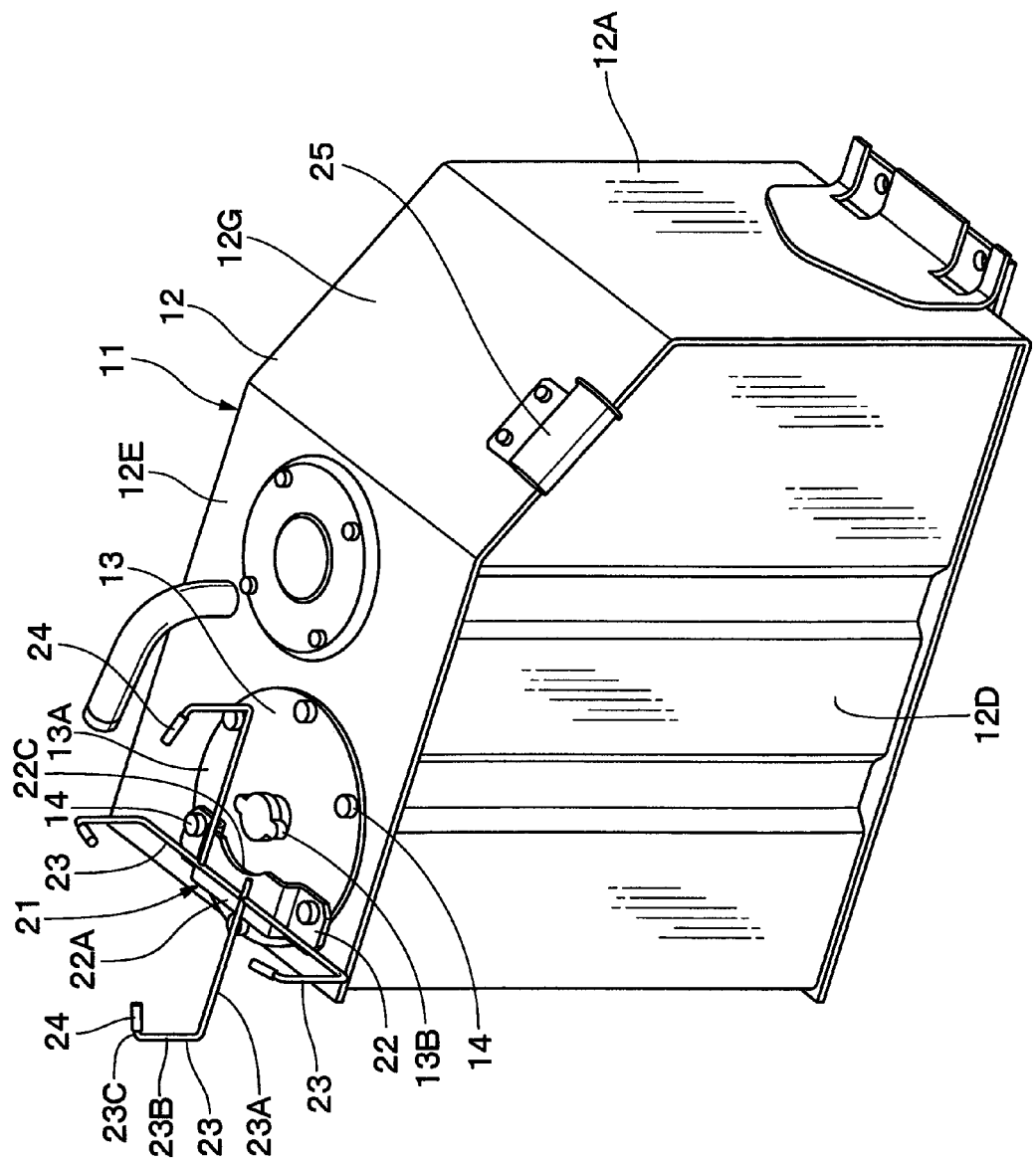
FIG. 5 is an external perspective view of a similar position to that of FIG. 4 illustrating the operating oil tank, the hose looping supporter, and the suction port holding member in enlarged form.

Further, as shown in FIGS. 1 to 3, the exterior housing cover 10 is largely constituted by an engine cover 10A located on the rear side of the cab 6 to cover the engine 7 and the like and a tank cover 10B provided on the right side of the cab 6 to cover the operating oil tank 11, the fuel tank 15, the fuel pump 18, and the like. Further, the tank cover 10B is openable in the forward and rearward direction by using its front portion as a fulcrum. When the tank cover 10B is opened toward the front side, the operating oil tank 11, the fuel tank 15, the fuel pump 18, the suction hose 19, and the like can be exposed to the outside, as shown in FIG. 3, thereby making it possible to effect the replenishing of the fuel tank 15.

Indicated at 11 is an operating oil tank, and the operating oil tank 11 is provided on top of the revolving frame 5 by being located on the side of a revolving center O of the upper revolving structure 3, as shown in FIG. 2. This operating oil tank 11 stores therein operating oil which is supplied to the hydraulic pump. Further, the operating oil tank 11 is largely constituted by a tank body 12 and a lid 13 which will be described hereinafter.

Indicated at 12 is a tank body shaped in the form of an upright body and having at least a top surface in order to constitute the operating oil tank 11. Specifically, this tank body 12 causes pressure to act in its interior so as to be able to efficiently supply the operating oil to the hydraulic pump. For this reason, by using such as steel plates, a resin material, or the like, the tank body 12 is formed with high strength as a rectangular parallelepiped box structure which is elongated in the forward and rearward direction and in the vertical direction. Namely, as shown in FIGS. 4 to 8, the tank body 12 is formed as a container of a substantially rectangular parallelepiped by a front plate 12A, a rear plate 12B, a left side plate 12C, a right side plate 12D, a top plate 12E, and a bottom plate 12F. Further, an inclined surface 12G for enlarging the field of view of the right forward side from a driver's seat (not shown) is formed at a corner position between the front plate 12A and the top plate 12E. Still further, an opening portion (not shown) for repairing and inspecting the interior is formed in the top plate 12E.

Figure 6:
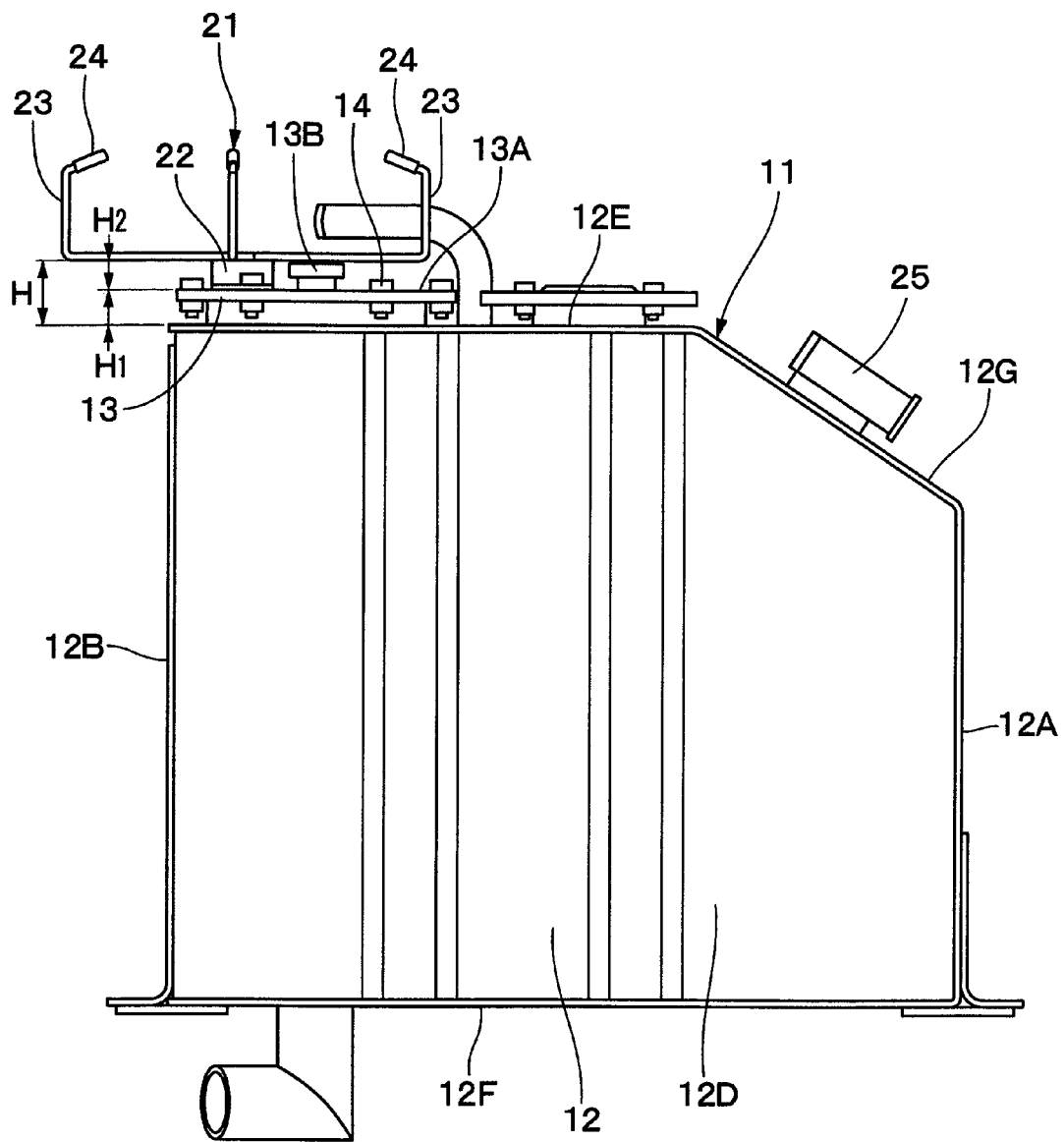
FIG. 6 is a front view illustrating the operating oil tank, the hose looping supporter, and the suction port holding member in enlarged form.
Figure 7:
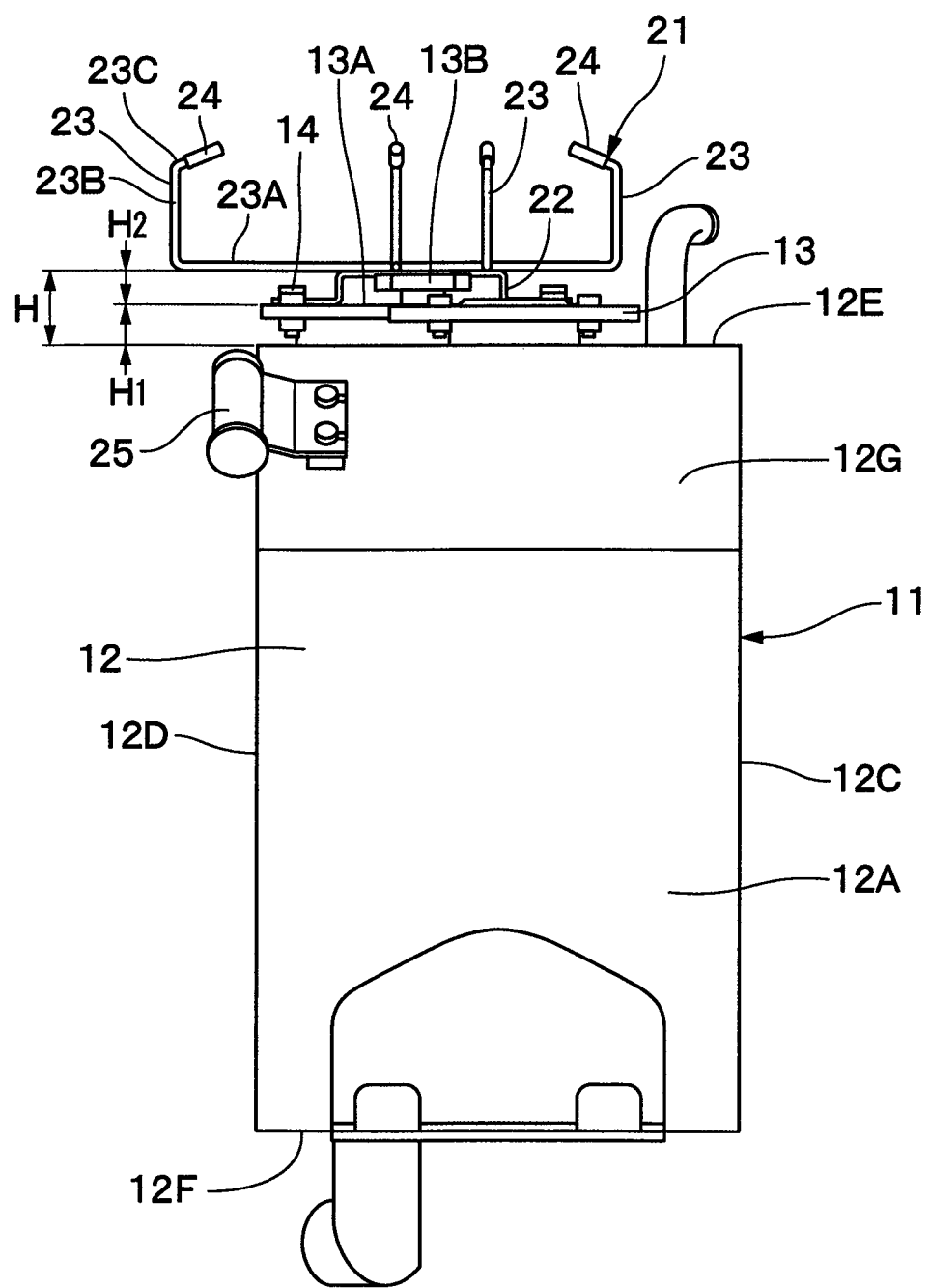
FIG. 7 is a right side view of FIG. 6 illustrating the operating oil tank, the hose looping supporter, and the suction port holding member in enlarged form.
Figure 8:
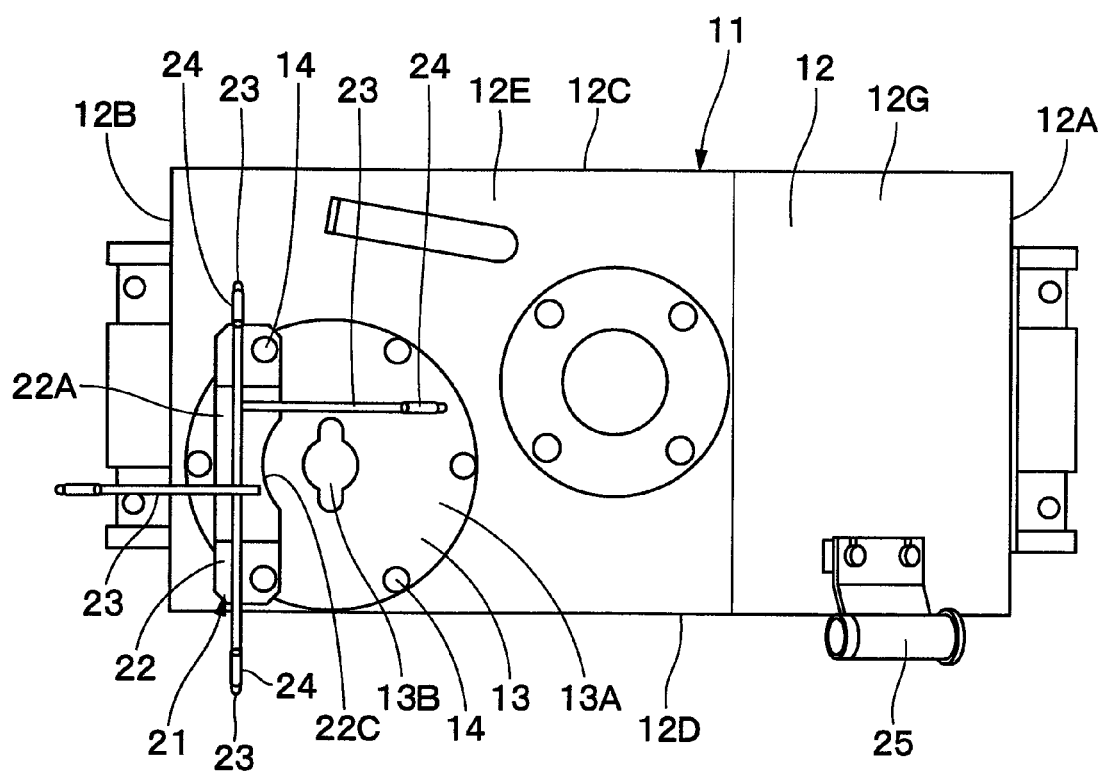
FIG. 8 is a plan view of FIG. 6 illustrating the operating oil tank, the hose looping supporter, and the suction port holding member in enlarged form.

Indicated at 13 is a lid provided on top of the top plate 12E to close an opening portion in the top plate 12E of the tank body 12. This lid 13 is mounted in such a manner as to be capable of being mounted and dismounted by using a plurality of, for example, six bolts 14, two of which are also used in fixing a below-described hose looping supporter 21 to an upper surface 13A thereof. Moreover, as shown in FIGS. 6 and 7, the upper surface 13A of the lid 13 is at the position of a height dimension H1 with respect to the top plate 12E of the tank body 12. Further, a maintenance cap 13B for performing the inspection of the operating oil is detachably fitted at the center of the lid 13.

Here, the operating oil tank 11 is disposed on the side of the revolving center O of the upper revolving structure 3 in a narrow range between the cab 6 and the fuel tank 15. For this reason, as for the operating oil tank 11, the tank body 12 is formed with a large height dimension as compared with the fuel tank 15, as indicated by dotted lines in FIG. 1, so as to be able to store a sufficient amount of operating oil. In consequence, when the tank cover 10B for constituting the exterior housing cover 10 is opened, the top plate 12E of the tank body 12 is substantially flat and is at a highest position, and its surrounding is a wide space devoid of obstacles.

Indicated at 15 is a fuel tank, and this fuel tank 15 is installed on the revolving frame 5 by being located adjacent to the right side in the widthwise direction of the vehicle body relative to the operating oil tank 11. This fuel tank 15 stores therein the fuel which is supplied to the engine 7, and is formed as a sealed container shaped in the form of a rectangular parallelepiped by such as molding using a resin material or welding using steel plates and the like. In addition, the front side of the fuel tank 15 projects upward to form a projecting portion 15A, and a cap 16 is detachably fitted to the top side of that projecting portion 15A, as shown in FIG. 3. Further, a level sensor 17 is provided on the front side of the projecting portion 15A, and this level sensor 17 informs that the tank is filled up during replenishing, and is formed of a transparent tube, for example.

Further, a description will be given of the relationship of arrangement of the operating oil tank 11 and fuel tank 15. The operating oil tank 11 and the fuel tank 15 are arranged by being juxtaposed in the left-right direction (widthwise direction of the vehicle body) of the upper revolving structure 3 in a state of being adjacent to each other. Namely, the operating oil tank 11 is provided on the side of the revolving center O of the upper revolving structure 3 close to the cab 6, and the fuel tank 15 is provided on the outer peripheral side (on the side away from the revolving center O) of the upper revolving structure 3. Further, the fuel tank 15 has a lower height dimension than the operating oil tank 11, and a below-described battery 26 is disposed on its top surface.

Indicated at 18 is a fuel pump disposed on the front side of the operating oil tank 11 in the vicinity of the fuel tank 15. This fuel pump 18 is disposed at a position in close proximity to both the operating oil tank 11 and the fuel tank 15. Moreover, the fuel pump 18, which injects fuel into the fuel tank 15 from a below-described oil storage container 27 for replenishment, is constituted by, for example, a plunger pump, a gear pump, a trochoid pump, a vane pump, or the like. Further, the fuel pump 18 is fixed to the revolving frame 5 through a mounting bracket 18A and can be operated and stopped by a switch 18B. Still further, the below-described suction hose 19 is connected to a suction port of the fuel pump 18, and a delivery hose 20 is connected to a delivery port (neither are shown) thereof.

Indicated at 19 is a suction hose connected to the fuel pump 18, and this suction hose 19 sucks the fuel in the oil storage container 27 toward the fuel pump 18. Further, the suction hose 19 is constituted by an elongated flexible hose made of rubber, resin, or the like, and its base end portion is connected to the suction port of the fuel pump 18. Moreover, a distal end portion of the suction hose 19 is formed as a cylindrical suction port 19A for sucking the fuel. A strainer for preventing the suction of foreign objects and a check valve (neither are shown) for preventing the efflux (reverse flow) of the fuel remaining in the suction hose 19 are incorporated in that suction port 19A.

Figure 11:
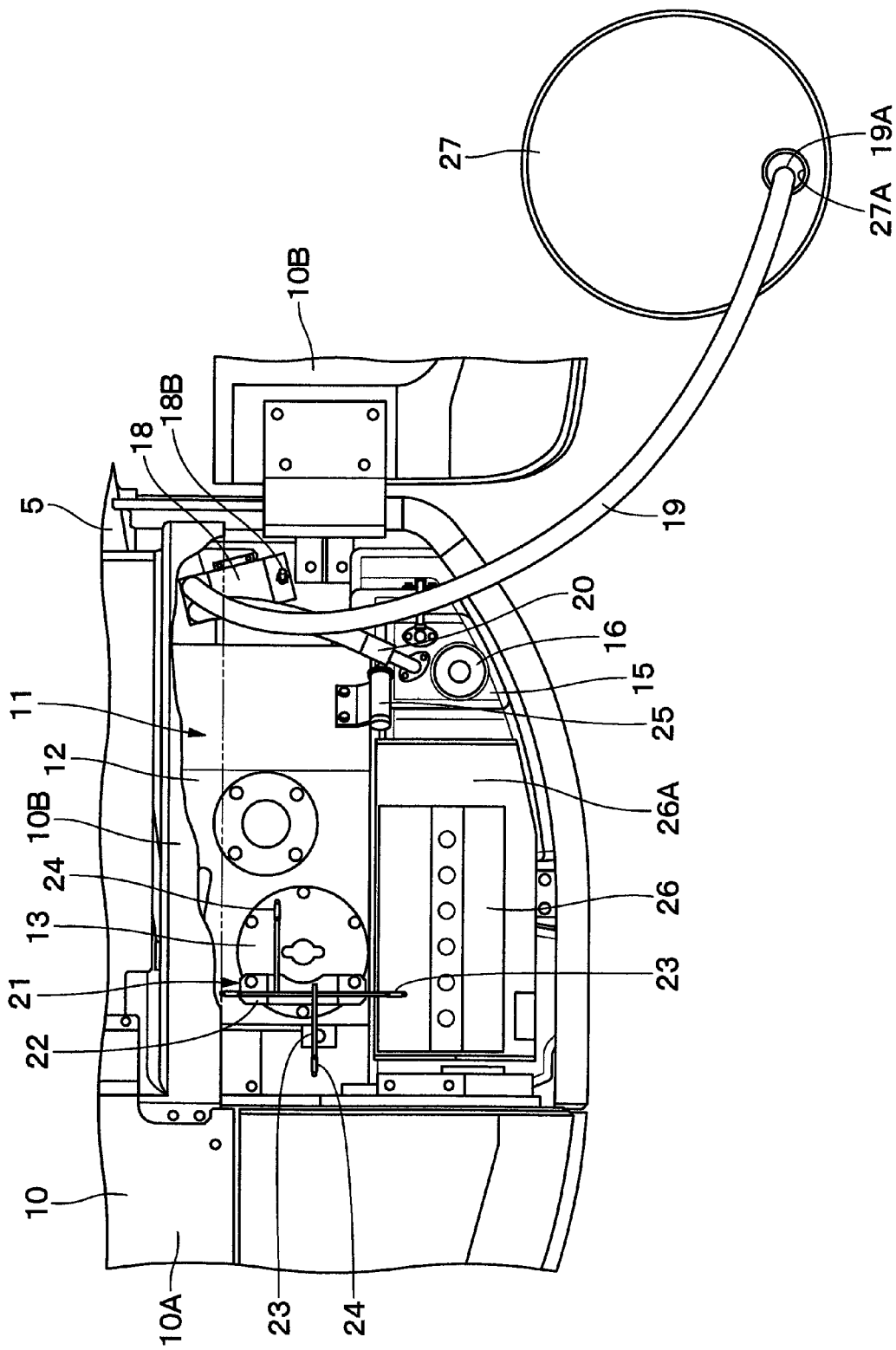
FIG. 11 is a plan view illustrating a state in which fuel in an oil storage container is being replenished with the looped hose portion of the suction hose removed from the hose looping supporter.

As shown in FIG. 11, the suction hose 19 is formed with a sufficiently long length so as to reach the oil storage container 27 such as a drum can disposed in the environment of the hydraulic excavator 1. Meanwhile, as shown in such as FIG. 4, a lengthwise midway portion of the suction hose 19 is annularly looped to form a looped hose portion 19B. As this looped hose portion 19B is supported by the below-described hose looping supporter 21, the suction hose 19 can be stored within the tank cover 10B.

Here, since the looped hose portion 19B of the suction hose 19 is looped by, for example, one and a half turn in a large annular shape (diametrical dimension), a loop kink is unlikely formed, so that the looped hose portion 19B of the suction hose 19 can be easily winded up or extended straightly. It should be noted that the number of turns of the looped hose portion 19B changes depending on the length of the suction hose 19 and on the size of retaining arms 23 of the hose looping supporter 21.

Indicated at 20 is a delivery hose connected to the fuel pump 18, and this delivery hose 20 has its base end portion connected to the delivery port of the fuel pump 18. Further, the delivery hose 20 has a connector 20A provided on its distal end side and extending to the upper side, the connector 20A being connected to the top of the projecting portion 15A of the fuel tank 15.

Next, referring to FIGS. 3 to 11, a description will be given of the construction of the hose looping supporter 21 which is used to support the suction hose 19 of the fuel pump 18.

Indicated at 21 is a hose looping supporter provided on the top surface side of the operating oil tank 11. As shown in FIGS. 5 to 9, this hose looping supporter 21 is mounted on the upper surface 13A of the lid 13 located on the rear side of the top plate 12E of the tank body 12 for constituting the operating oil tank 11. Further, as shown in FIG. 10, the hose looping supporter 21 is constituted by a mounting member 22, the retaining arms 23, and protection caps 24 which will be described hereinafter.

Indicated at 22 is a mounting member of the hose looping supporter 21, and this mounting member 22 is for mounting the hose looping supporter 21 to the operating oil tank 11. Further, the mounting member 22 is formed in a swell shape by, for example, bending a rectangular metal plate such that a central arm mounting portion 22A projects upward by a height dimension H2.

In the case where the mounting member 22 is thus mounted on the upper surface 13A of the lid 13, each retaining arm 23 of the hose looping supporter 21 can be disposed at a position which is high by a total height dimension H of the height dimension H1 of the lid 13 and the height dimension H2 of the arm mounting portion 22A of the mounting member 22. As a result of this, the looped hose portion 19B of the suction hose 19 supported by the respective retaining arms 23 can be held at a position spaced apart by the height dimension H upwardly from the upper surface 13A of the lid 13.

Besides, bolt holes 22B are respectively provided on both end sides of the mounting member 22, and these bolt holes 22B are disposed in correspondence with a mounting pitch of the two bolts 14 located on the rear side of the maintenance cap 13B. In consequence, the mounting member 22 can be fixed by using the common bolts 14 to the upper surface 13A of the lid 13.

Further, the mounting member 22 has a circular arc-shaped notched recess portion 22C on the front side of the arm mounting portion 22A. This notched recess portion 22C is formed so as not to cause a hindrance when the maintenance cap 13B of the lid 13 is rotated to be removed.

Indicated at 23 are four retaining arms, and these retaining arms 23 are fixed to the arm mounting portion 22A of the mounting member 22 in such a manner as to extend in four directions including forward, backward, leftward, and rightward directions. Further, each retaining arm 23 retains the looped hose portion 19B of the suction hose 19 from its outer peripheral side. Furthermore, the respective retaining arms 23 are secured to the top of the arm mounting portion 22A by a securing means such as welding, so as to be perpendicular to each other and extend upward.

Figure 9:
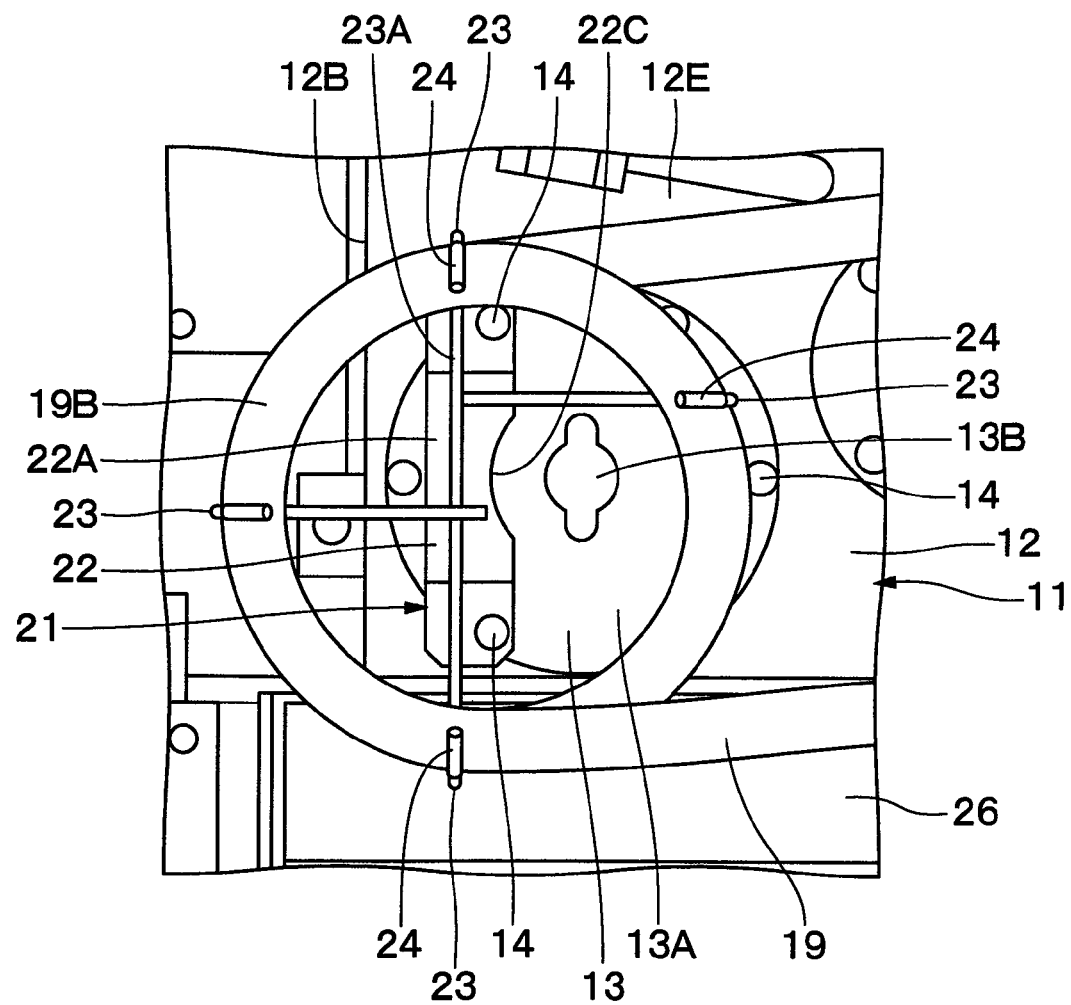
FIG. 9 is an enlarged plan view of essential portions in FIG. 3 illustrating the hose looping supporter and a looped hose portion of the suction hose.
Figure 10:
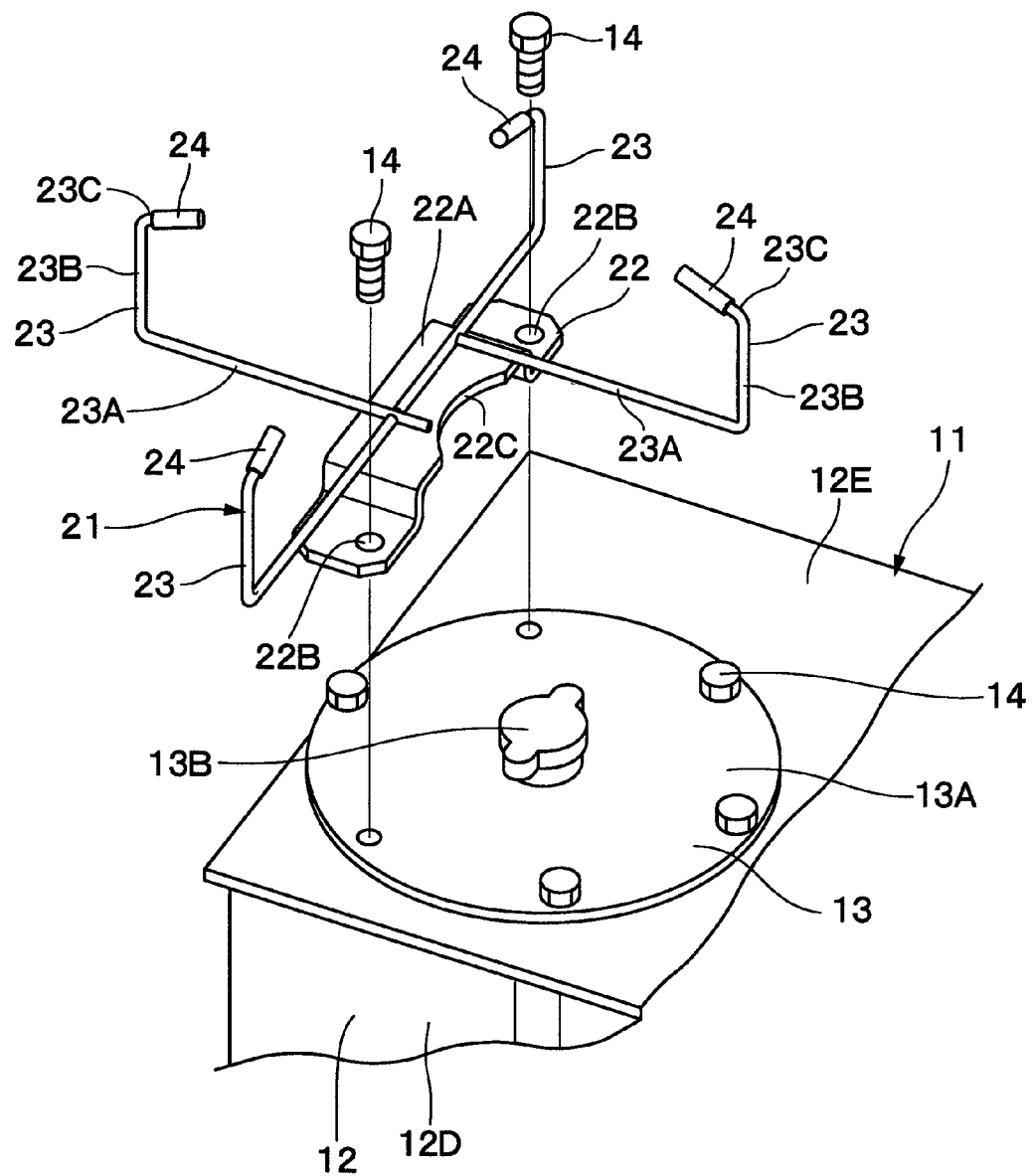
FIG. 10 is an exploded perspective view illustrating an upper rear side portion of the operating oil tank and the hose looping supporter in an exploded state.

In this case, as shown in FIG. 9, the respective retaining arms 23 are disposed such that the supported looped hose portion 19B does not cover over the maintenance cap 13B of the lid 13. Namely, of the four retaining arms 23, the front-side retaining arm 23 extending on the side of the maintenance cap 13B of the lid 13 is disposed by being offset to the left side so as to avoid that maintenance cap 13B.

Here, each retaining arm 23 is formed by, for instance, bending a metal round bar substantially into a J-shape so as not to damage the suction hose 19. Specifically, each retaining arm 23 is constituted by a horizontal portion 23A mounted with respect to the arm mounting portion 22A of the mounting member 22 in such a manner as to extend in an outward-directed horizontal direction, a vertical portion 23B bent from a distal end of the that horizontal portion 23A and extending upward, and an inwardly bent portion 23C bent in an inwardly inclined manner from a distal end of that vertical portion 23B. Besides, each retaining arm 23 is mounted with respect to the mounting member 22 such that the vertical portions 23B and the inwardly bent portions 23C are located at substantially equal intervals.

Further, as for each retaining arm 23, the horizontal portion 23A retains the lower side of the looped hose portion 19B of the suction hose 19, and the vertical portion 23B holds the looped hose portion 19B tending to expand by repelling the bending force and clamps it from the outer peripheral side. Furthermore, in the state in which the looped hose portion 19B abuts against the vertical portion 23B, the inwardly bent portion 23C is able to prevent the looped hose portion 19B from coming off by restricting its upward movement.

Indicated at 24 is a protection cap fitted on the inwardly bent portion 23C of each retaining arm 23 in a covering manner. This protection cap 24 protects the suction hose 19 so as not to damage it by a tip of the metallic retaining arm 23 when the looped hose portion 19B of the suction hose 19 is mounted or dismounted.

Indicated at 25 is a suction port holding member mounted on the inclined surface 12G of the tank body 12 for constituting the operating oil tank 11. This suction port holding member 25 holds the suction port 19 of the suction hose 19, i.e., its distal end portion, when the looped hose portion 19B of the suction hose 19 is supported and fixed by the hose looping supporter 21. Besides, as shown in such as FIG. 5, the suction port holding member 25 is formed in the shape of a bottomed cylinder and is bolted to a right end of the inclined surface 12G of the tank body 12 with its bottom portion facing the front side.

In this case, by accommodating the suction port 19A of the suction hose 19 which has become a free end, the suction port holding member 25 is able to fix the distal end side of the suction hose 19 so that it will not run wild during traveling or operation. Further, the bottomed suction port holding member 25 is able to receive the residual fuel leaking out slightly from inside the suction hose 19, so that it will not scatter to the surroundings.

Indicated at 26 is a battery disposed on the upper side of a rear portion of the fuel tank 15 and supported by the operating oil tank 11. Namely, this battery 26 is installed on a supporting base 26A mounted on the operating oil tank 11 and extending on the operating oil tank 11 side. Namely, this battery 26 is disposed on the lower side of the hose looping supporter 21, as shown in FIG. 1. It should be noted that the battery 26 can be disposed by using an appropriate empty space, such as not only the upper side of the fuel tank 15 but the lower side of the operating oil tank 11, the front side of the engine 7, or the like.

Moreover, as shown in FIG. 11, indicated at 27 is an oil storage container such as a drum can in which fuel for replenishment is stored. A hose insertion port 27A for inserting the suction hose 19 is provided on the upper portion of this oil storage container 27.

The hydraulic excavator 1 in accordance with this embodiment has the above-described construction, and its operation will be described next.

First, the operator rides in the cab 6, manipulates an operation lever for traveling, and is thereby able to move the hydraulic excavator 1 forward or backward by the lower traveling structure 2. Besides, by manipulating an operation lever for work operation (neither are shown), the operator is able to perform such as the operation of excavating earth and sand by lowering and raising the working mechanism 4.

Next, a description will be given of the operation in the case of replenishing the fuel tank 15 with fuel. In this case, the oil storage container 27 with the fuel for replenishment stored therein is transported, and is disposed on, for example, the front side of the upper revolving structure 3, as shown in FIG. 11. On the other hand, as for the hydraulic excavator 1, the tank cover 10B for constituting the exterior housing cover 10 is opened to expose the operating oil tank 11, the fuel tank 15, the fuel pump 18, the suction hose 19, and the like. At this time, as for the suction hose 19, the looped hose portion 19B at the lengthwise midway portion is supported by the hose looping supporter 21 on the operating oil tank 11. Further, the suction port 19A at the distal end side is held by the suction port holding member 25.

Accordingly, the operator pulls out the suction port 19A on the distal end side of the suction hose 19 from the suction port holding member 25 to deform the looped hose portion 19B in the diameter reducing direction, and thereby removes the looped hose portion 19B from the respective retaining arms 23 of the hose looping supporter 21. Thus, the suction hose 19 can be removed simply from the suction port holding member 25 and the hose looping supporter 21 without using a tool or the like separately.

Moreover, as the removed suction hose 19 is pulled forward toward the oil storage container 27, the looped hose portion 19B can be easily extended. Then, the suction port 19A at the distal end is inserted into the hose insertion port 27A of the oil storage container 27. In the handling of this suction hose 19, since the looped hose portion 19B is looped in a large annular shape (diametrical dimension), a loop kink is unlikely formed, so that the suction hose 19 can be handled easily.

Next, after the insertion of the suction port 19A of the suction hose 19 into the oil storage container 27, the switch 18B is operated to drive the fuel pump 18, thereby making it possible to suck the fuel in the oil storage container 27 from the suction hose 19 and inject it into the fuel tank 15 through the delivery hose 20.

Meanwhile, after completion of the replenishing of the fuel tank 15, the suction hose 19 is moved to the upper side of the operating oil tank 11 and is looped so as to be accommodated within each retaining arm 23 of the hose looping supporter 21, thereby forming the looped hose portion 19B. Since a force which tends to cause the suction hose 19 to extend straightly acts in this looped hose portion 19B in the diameter enlarging direction, the looped hose portion 19B can be abutted against each retaining arm 23 with a pressing force, and can be fixed stably with respect to vibrations during traveling or operation.

Furthermore, in the state in which the suction hose 19 is looped, the suction port 19A of the suction hose 19 can be accommodated and held within the suction port holding member 25 in a reliable manner. Moreover, the suction port holding member 25 is capable of fixing the distal end portion of the suction hose 19 so that it does not run wild. Besides, the suction port holding member 25 is able to receive the residual fuel leaking out slightly from inside the suction hose 19.

Thus, according to this embodiment, the construction provided is such that the hose looping supporter 21 is provided on the top surface side of the tank body 12 for constituting the operating oil tank 11, and the hose looping supporter 21 retains the looped hose portion 19B, which is formed by annularly looping a midway portion of the suction hose 19, from the outer peripheral side by the four retaining arms 23.

Accordingly, the suction hose 19 can be removed simply from each retaining arm 23 of the hose looping supporter 21 by merely deforming its looped hose portion 19B in the diameter reducing direction. Meanwhile, the suction hose 19 can be supported simply by the hose looping supporter 21 by forming the looped hose portion 19B by looping the midway portion within each retaining arm 23 of the hose looping supporter 21.

As a result, the hose looping supporter 21 is able to support the looped hose portion 19B of the suction hose 19 without separately using a binding band or the like, so that operations of mounting and dismounting the suction hose 19 with respect to the hose looping supporter 21 can be performed easily, thereby improving workability at the time of replenishing the fuel tank 15.

Further, since the midway portion of the suction hose 19 is looped in a large annular shape and is mounted to the hose looping supporter 21, the looped hose portion 19B can be formed by easily looping the midway portion of the suction hose 19. Meanwhile, the looped hose portion 19B can be easily extended by pulling the distal end side of the suction hose 19. As a result of this, a loop kink is difficult to be formed in the suction hose 19, so that the suction hose 19 can be handled easily.

Furthermore, since the hose looping supporter 21 is provided on top of the lid 13 of the operating oil tank 11 which is the highest place within the tank cover 10B, there are few objects that lie in the way at the time of performing the operation of mounting and dismounting the suction hose 19, and the suction hose 19 can be handled in a wide space. Moreover, the operator is able to engage in the operation in a comfortable posture without needing to bend down. Workability can be improved in these respects as well.

Moreover, the hose looping supporter 21 is able to allow the looped hose portion 19B tending to undergo expansion in diameter to be retained by each retaining arm 23 with a pressing force by making use of the force with which the looped hose portion 19B tends to extend straightly. In consequence, the hose looping supporter 21 is able to stably support the looped hose portion 19B even when vibrations have occurred during traveling or operation, thereby making it possible to improve reliability and the like.

Meanwhile, the hose looping supporter 21 is provided with four retaining arms 23 at intervals in the circumferential direction of the looped hose portion 19B of the suction hose 19, e.g., so as to be perpendicular to each other. In consequence, since each retaining arm 23 is able to stably hold the circular shape of the looped hose portion 19B with respect to vibrations and the like, the retaining arms 23 are able to support the looped hose portion 19B with a good balance, so that it is impossible to improve the handling efficiency, reliability, and the like.

In this case, since the inwardly bent portion 23C which is bent inwardly is formed on the distal end side of each retaining arm 23, the upward movement of the looped hose portion 19B can be restricted by this inwardly bent portion 23C, making it possible to prevent the looped hose portion 19B from coming off. Further, since the protection cap 24 is provided on the tip of the inwardly bent portion 23C, it is possible to prevent the damage of the suction hose 19 by the tip of the retaining arm 23.

On the other hand, the construction provided is such that the lid 13 of the operating oil tank 11 is at the position of the height dimension H1 from the top plate 12E of the tank body 12, and the hose looping supporter 21 has the arm mounting portion 22A of the mounting member 22 projecting upward by the height dimension H2. Accordingly, each retaining arm 23 mounted on the arm mounting portion 22A can be disposed at a position spaced apart by the height dimension H upwardly from the upper surface 13A of the lid 13. In consequence, the hose looping supporter 21 makes it possible to loop the looped hose portion 19B of the suction hose 19 at a position spaced apart upwardly from such as the top plate 12E of the tank body 12, the upper surface 13A of the lid 13, and the bolts 14.

Therefore, it is possible to prevent the suction hose 19 and the operating oil tank 11 from contacting and interfering with each other, and prolong the service life of the suction hose 19. Since a working space can be formed between the operating oil tank 11 and the suction hose 19, it is possible to remove the maintenance cap 13B of the operating oil tank 11 with the hose looping supporter 21 mounted thereon, and perform the maintenance work and the like with ease. In this case, since the notched recess portion 22C is formed in the mounting member 22 of the hose looping supporter 21, attachment and detachment of the maintenance cap 13B can be effected in a reliable manner.

Further, since the operating oil tank 11 is provided with the suction port holding member 25 for holding the suction port 19A on the distal end side of the suction hose 19, the distal end portion of the suction hose 19 can be fixed so that it will not run wild during traveling or operation. Since the bottomed cylindrical suction port holding member 25 is able to accommodate the suction port 19A of the suction hose 19, the suction port holding member 25 is able to receive the residual fuel leaking out slightly from the suction port 19A, thereby making it possible to keep the surroundings of the operating oil tank 11 and the like clean.

Besides, since the hose looping supporter 21 can be mounted to the lid 13 by the bolts 14 for mounting the lid 13 to the tank body 12, the hose looping supporter 21 can be mounted and dismounted together with the lid 13. Moreover, the hose looping supporter 21 can be mounted simply by using the existing bolts 14 for mounting the lid 13 without requiring a special mounting portion, so that it is possible to attain reduction of the number of parts, improvement of assembly workability, and the like.

Further, since the hose looping supporter 21 is provided on the top surface side of the operating oil tank 11, the space above that operating oil tank 11 can be effectively utilized as the place of disposition of the looped hose portion 19B of the suction hose 19, and the suction hose 19 can be efficiently accommodated within the tank cover 10B of the exterior housing cover 10. As the hose looping supporter 21 is provided on top of the operating oil tank 11, other equipment such as the battery 26 can be disposed on the top surface side of the fuel tank 15.

Figure 12:
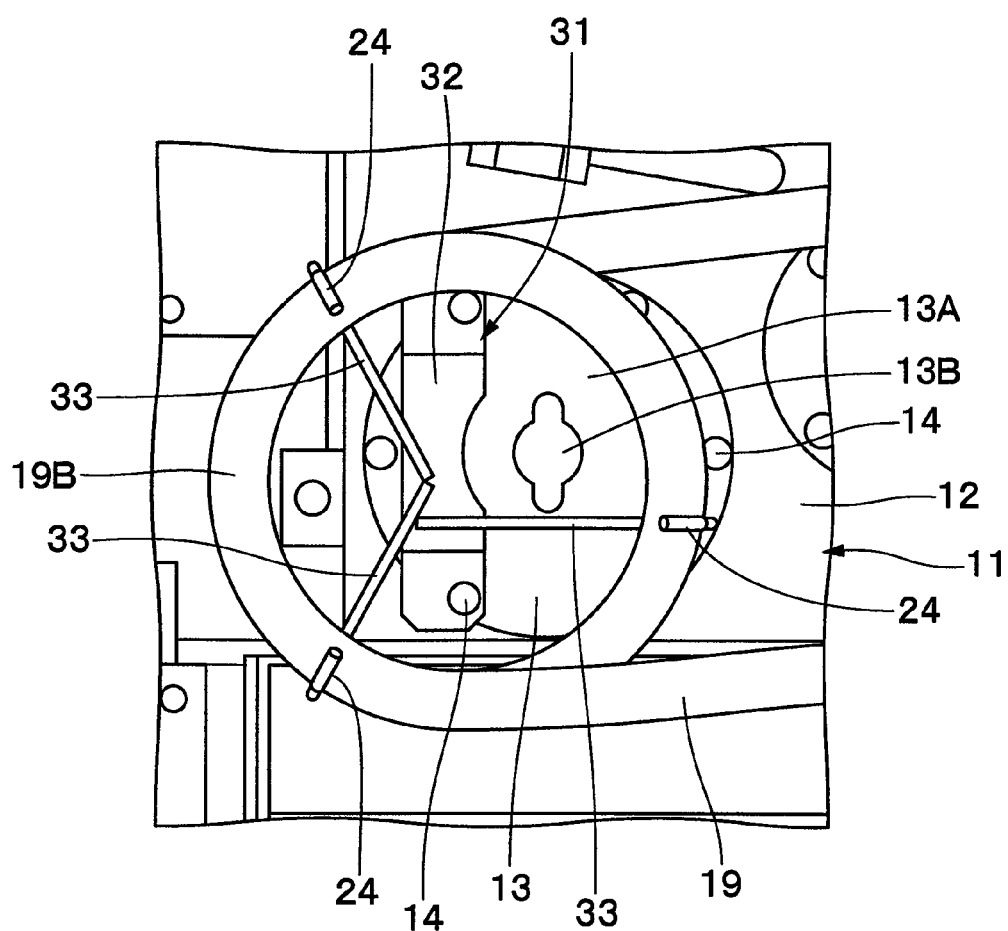
FIG. 12 is an enlarged plan view of essential portions of the hose looping supporter in accordance with a first modification of the present invention, taken from a similar position to that of FIG. 9.

It should be noted that, in this embodiment, a description has been given by citing the example in which the four retaining arms 23 for forming the hose looping supporter 21 are provided in such a manner as to be perpendicular to each other in the circumferential direction of the looped hose portion 19B of the suction hose 19. However, the present invention is not limited to the same, and a construction may be adopted in which, for example, as in the case of a hose looping supporter 31 in accordance with a first modification shown in FIG. 12, three retaining arms 33 are provided on the top surface side of a mounting member 32. In this case, the three retaining arms 33 should desirably be disposed at substantially identical intervals in the circumferential direction of the looped hose portion 19B so as not to cover over the maintenance cap 13B of the lid 13. Besides, a construction may be adopted in which two or five or more retaining arms are provided.

Further, in the embodiment, the case is illustrated in which the hose looping supporter 21 is formed by mounting the four retaining arms 23 formed by bending round bars, on top of the mounting member 22. However, the invention is not limited to the same, and a construction may be adopted in which, for example, a plate is cut out into a cruciform shape, and four retaining arms are integrally formed by appropriately bending the four arm portions.

On the other hand, in the embodiment, the construction provided is such that the hose looping supporter 21 is provided on top of the lid 13 located on the top surface side of the operating oil tank 11, and the suction port holding member 25 is provided on the inclined surface 12G of the tank body 12. However, the invention is not limited to the same, and a construction may be adopted in which, for example, as in a second modification shown in FIG. 13, a hose looping supporter 21' and a suction port holding member 25', which are structured in the same way as those of the first embodiment, are provided on the top surface side of the fuel tank 15. Namely, the construction may be such that the hose looping supporter 21' is constituted by a mounting member 22' and retaining arms 23', and the looped hose portion 19B of the suction hose 19 is supported by these retaining arms 23'. In this case, it suffices if the battery (not shown) is arranged to be provided in an empty space on such as the lower side of the fuel tank 15, for example.

Further, in the embodiment, the construction provided is such that the hose looping supporter 21 is mounted to the lid 13 by making use of the bolts 14 for mounting the lid 13 to the tank body 12. However, the invention is not limited to the same, and a construction may be adopted in which, for example, the hose looping supporter 21 is mounted to the lid 13 by using exclusive bolts or the like provided separately from the bolts 14 for mounting the lid 13 to the tank body 12. Moreover, the hose looping supporter 21 may be so constructed as to be mounted on the top plate 12E of the tank body 12.

Meanwhile, although in the embodiment a description has been given by citing as an example the case in which the fuel pump 18 is disposed on the front side of the operating oil tank 11, the fuel pump 18 may be constructed to be disposed at another place such as a front side position or a lateral position of the fuel tank 15 in accordance with the layout conditions of equipment mounted on the upper revolving structure 3.

Furthermore, in the embodiment, a description has been given by assuming that the fuel pump 18 is connected to the fuel tank 15 through the delivery hose 20. However, the invention is not limited to the same, and a construction may be adopted in which, for example, the delivery hose 20 is disused, and the delivery port of the fuel pump 18 is connected directly to the fuel tank 15.

Moreover, in the embodiment a description has been given by citing as an example of the hydraulic excavator 1 having the crawler-type lower traveling structure 2 as construction machines. However, the invention is not limited to the same, and may be applied to a hydraulic excavator having, for example, a wheel-type lower traveling structure. Furthermore, the invention is also widely applicable to other construction machines such as a hydraulic crane, a wheel loader, a tractor, and the like other than the hydraulic excavator.

The invention claimed is:

1. A construction machine comprising:
   an automotive lower traveling structure;
   an upper revolving structure which is mounted swingably on said lower traveling structure and having a working mechanism mounted on a front part thereof and an engine for driving a hydraulic pump mounted on a rear part thereof;
   an operating oil tank which is formed as a box structure and provided on said upper revolving structure in a horizontal position by being located on a side of a revolving center of said upper revolving structure and adapted to store operating oil to be supplied to said hydraulic pump;
   a fuel tank provided on said upper revolving structure adjacently to said operating oil tank and adapted to store fuel to be supplied to said engine;
   a fuel pump for injecting the fuel into said fuel tank from a container with the fuel for replenishment stored therein; and
   an elongated suction hose provided by being connected to a suction port of said fuel pump and adapted to suck the fuel in said container toward said fuel pump, characterized in that;
   said fuel pump is provided on a front side of said operating oil tank, a delivery side thereof being connected to said fuel tank,
   a hose looping supporter for supporting a looped hose portion formed by annularly looping a lengthwise midway portion of said suction hose in a horizontal direction is provided on a top surface which is flat and at a highest position of said horizontal operating oil tank,
   said hose looping supporter clamps said looped hose portion from an outer peripheral side on said top surface side of said operating oil tank by resisting against a force in the diameter enlarging direction which acts in a radial direction of said looped hose portion of said suction hose.

2. The construction machine according to claim 1, wherein said hose looping supporter has a plurality of circumferentially spaced retaining arms for retaining said looped hose portion of said suction hose at spaced intervals so that said suction hose does not spread.

3. The construction machine according to claim 1, wherein said hose looping supporter is constituted by a mounting member formed of a plate-like body and mounted on said top surface of said operating oil tank and a plurality of circumferentially spaced retaining arms each formed by bending a bar-like body substantially into a J-shape extending in a horizontal direction and vertical direction and secured to said mounting member at spaced intervals whereby the ends of the J-shapes extend upward.

4. The construction machine according to claim 1, wherein a suction port holding member for holding a suction port of a distal end portion of said suction hose is provided on said operating oil tank.

5. The construction machine according to claim 1, wherein said operating oil tank is constituted by an upright body-shaped tank body having at least said top surface and by a lid provided detachably on a top surface side of said tank body, and said hose looping supporter is mounted on said lid.

6. The construction machine according to claim 1, wherein said hose looping supporter supports said looped hose portion of said suction hose at a position spaced apart by a certain dimension upwardly from said top surface of said operating oil tank.

7. The construction machine according to claim 1, wherein said operating oil tank and said fuel tank are provided on said upper revolving structure by being juxtaposed in a widthwise direction of said upper revolving structure.

* * * * *